Feb. 1, 1927.
D. U. POWELL
1,616,390
PIPE SADDLE
Filed Jan. 11, 1926
2 Sheets-Sheet 1
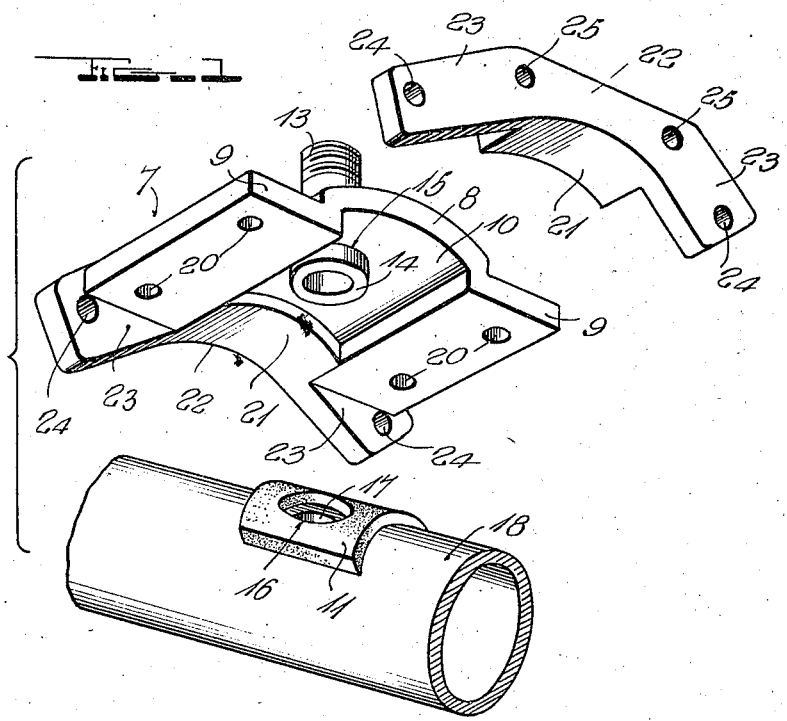
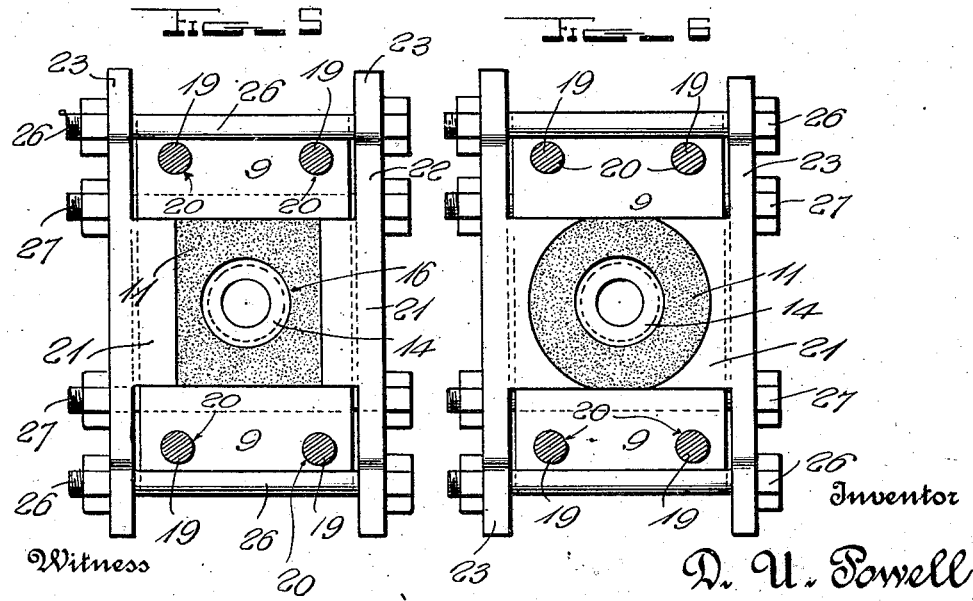
Inventor
D. U. Powell, Feb. 1, 1927.
D. U. POWELL
1,616,390
PIPE SADDLE
Filed Jan. 11, 1926    2 Sheets-Sheet 2
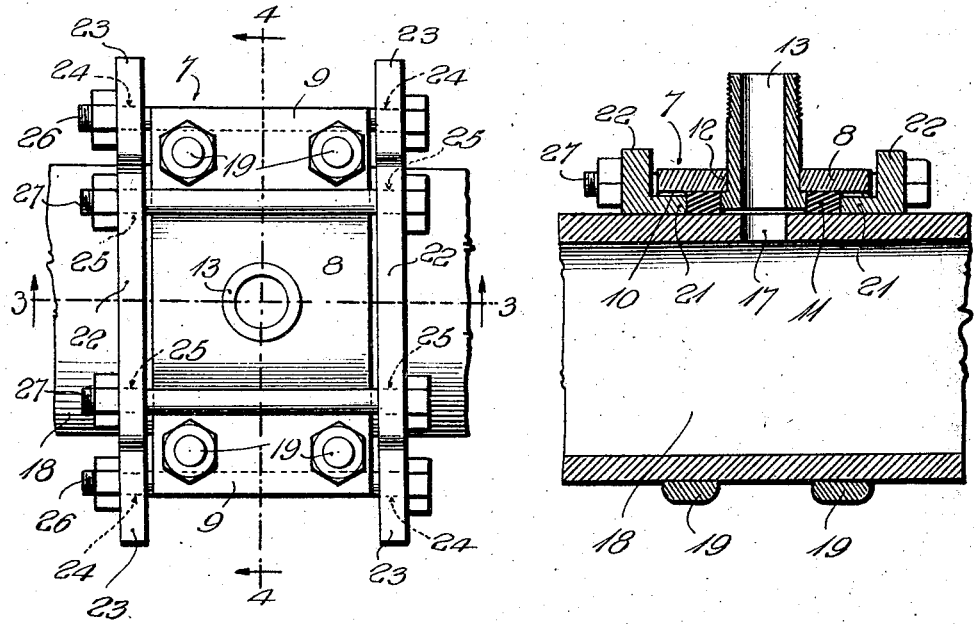
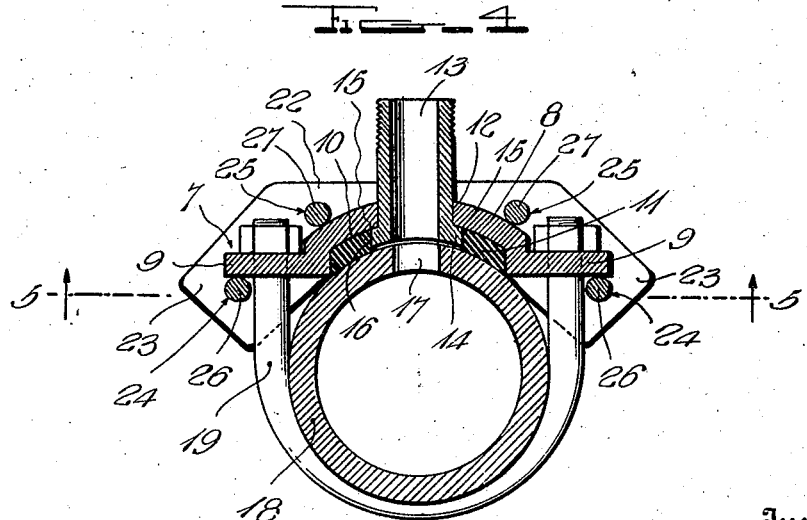
Inventor
D. U. Powell,
By H. B. Wilson & Co
Attorneys Patented Feb. 1, 1927.

1,616,390

UNITED STATES PATENT OFFICE.

DALTON U. POWELL, OF WOODSFIELD, OHIO.

PIPE SADDLE.

Application filed January 11, 1926. Serial No. 80,556.

My invention relates to improvements in saddles which are used for connecting branch pipes with mains or other pipe lines, and the invention relates more specifically to a pipe saddle of the general type disclosed by U. S. Patent No. 1,131,003, issued jointly to myself and J. W. Hardwick, on March 9, 1915. In the patented structure, the inner side of the saddle was provided with an open-ended recess to receive packing, a pair of followers were slidable in opposite ends of this recess to effect compression of the packing, and bolts were employed to draw the followers inwardly to operative positions. Difficulty was experienced however with this construction, as the followers would very often cant and bind so tightly that they could not be drawn inwardly to effect compression of the packing. It is one object of the present invention to provide a new and improved construction, in which canting of the followers cannot take place.

When connecting the branch pipe to a saddle of the type shown in the patent above referred to, or to saddles of certain other types, the branch pipe is usually threaded into an opening in the saddle. This saddle is customarily secured in place upon the pipe by U-bolts or the like whose ends pass through openings in the ends of the saddle, and when these U-bolts are tightened, the siddle is often so sprung as to distort the shape of the branch-pipe-receiving-opening, so that great difficulty is encountered when attempting to thread such branch pipe into the opening. It is another aim of my invention to provide a new and improved construction in which this difficulty cannot arise.

With the foregoing in view, the invention resides in the novel subject matter hereinafter described and claimed, the description being supplemented by the accompanying drawings.

Figure 1 is a disassembled perspective view, parts being omitted.

Figure 2 is an outer side elevation.

Figure 3 is a longitudinal sectional view on line 3—3 of Fig. 2.

Figure 4 is a transverse sectional view as indicated by line 4—4 of Fig. 2.

Figure 5 is a horizontal sectional view as indicated by line 5—5 of Fig. 4.

Figure 6 is a view similar to Fig. 5 but illustrating a different shape of follower and packing.

In the drawings above briefly described, the numeral 7 designates a saddle preferably formed by dye-stamping a single metal plate, so as to form it with an arched intermediate portion 8 and straight ends 9. The formation 8 provides a recess 10 at the inner side of the saddle, adapted to receive an elastic compressible packing 11 which may be of any desired contour, as will be clear by comparing Figs. 5 and 6.

The intermediate portion 8 of the saddle 7 is formed with a circular opening 12 through which a short pipe section 13 passes, the inner end of said pipe section having a continuous outstanding integral flange 14 which abuts the inner side of the saddle. This flange is welded to the inner surface of the saddle along the line 15, and this construction possesses advantages over that heretofore used, for reasons hereinafter set forth.

The packing 11 is formed with an opening 16 receiving the flanged inner end of the pipe section 13, and this pipe section is adapted for alinement with an opening 17 in a main 18, upon which the saddle is clamped by U-bolts or the like 19, the ends 9 of the saddle being formed with openings 20 through which the ends of said U-bolts pass. When these bolts are tightened to compress the packing 11, there is a tendency to longitudinally spring the saddle 7, and even though this springing should distort the outer end of the opening 12 so that it is not truly circular, such distortion will not affect the shape of the pipe section 13, and the branch pipe may readily be connected with the other end of the latter. In no instance, is the springing of the saddle sufficient to break loose the welding by which the flange 14 is secured to the saddle.

Two curved followers 21 are slidable into the opposite ends of the recess 10 to effect additional compression of the packing 11, as in the prior patent hereinbefore mentioned, and these followers may be of the shape shown in Fig. 5, of that disclosed in Fig. 6, or of any other desired form. The outer end of each follower is provided with an integral plate 22 which not only projects laterally beyond the outer side of said plate, but has its ends 23 projected laterally beyond the opposite edges of the follower. Each plate 22 is formed at its ends with two bolt holes 24 and between said ends with two bolt holes 25. Bolts 26 pass through the openings 24 of the two plates 22 and other bolts 27 pass through the bolt holes 25. The bolts 26 contact with the inner surfaces of the saddle ends 9 as shown most clearly in Fig. 4, while the bolts 27 contact with the outer surface of the intermediate saddle portion 8 as also disclosed in Fig. 4. It is also to be observed that the bolts 27 are disposed in a plane at the outer convex sides of the followers 21, whereas the bolts 26 are positioned in a plane at the inner concave side of said followers. By this relation of the bolts with respect to other parts, canting of the followers 21, as said bolts are uniformly tightened, is prevented, and if the bolts 26 should by any chance have a tendency to cant said followers, this tendency will be absolutely counteracted by the bolts 27. Thus, the followers may be inwardly adjusted smoothly and with ease, to produce the desired compression of the packing 11.

It will be seen from the foregoing that I have produced two distinct improvements in pipe saddles, one being the manner of securing the pipe section 13 to the saddle, while the other is the unique association of parts to prevent canting of the followers 21 while they are being inwardly adjusted.

I claim:

1. A pipe saddle having an open-ended packing recess in its inner side, packing-compressing followers slidable in the open ends of said recess, and combined guiding and compressing means for the followers engaging the inner and outer surfaces of the saddle to hold said followers against canting inwardly when moving them to operative position.

2. A pipe saddle having an open-ended packing recess in its inner side, packing-compressing followers slidable in the open ends of said recess, each of said followers having an outwardly projecting tranverse plate at its outer end, and longitudinal bolts connecting the two plates, a plurality of said bolts being positioned to counteract any tendency of the remaining bolts to cant said followers from a line parallel with the inner surface of the recess in the saddle or outer surface of the pipe.

3. A pipe saddle having an open-ended packing recess in its inner side, packing-compressing followers slidable in the open ends of said recess, each of said followers having an outwardly projecting transverse plate at its outer end, longitudinal bolts passing through the two plates and contacting with the inner surface of the saddle, and other longitudinal bolts passing through said plates and contacting with the outer surface of said saddle, said plates having openings snugly receiving said bolts, the relation of bolts, plate and saddle serving to prevent canting of the followers upon tightening of said bolts.

4. A pipe saddle having a packing recess in its inner side, an opening into said recess, and bolt holes at opposite sides of said recess to receive saddle-securing bolts, and a separate short pipe section passing through said opening and having an integral laterally projecting external flange abutting the inner side of the saddle, said flange being fixedly secured to the inner side of the saddle.

In testimony whereof I have hereunto affixed my signature.

DALTON U. POWELL.